United States Patent
Kanematsu (10) Patent No.: US 10,792,957 B2
(45) Date of Patent: Oct. 6, 2020

(54) PNEUMATIC TIRE

(71) Applicant: Sumitomo Rubber Industries, Ltd., Kobe-shi, Hyogo (JP)

(72) Inventor: Yoshiaki Kanematsu, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 493 days.

(21) Appl. No.: 15/417,592

(22) Filed: Jan. 27, 2017

(65) Prior Publication Data
US 2017/0232800 A1 Aug. 17, 2017

(30) Foreign Application Priority Data
Feb. 15, 2016 (JP) .................................. 2016-025775

(51) Int. Cl.
*B60C 11/12* (2006.01)
*B60C 11/13* (2006.01)
(Continued)

(52) U.S. Cl.
CPC .......... *B60C 11/1263* (2013.01); *B60C 11/04* (2013.01); *B60C 11/1204* (2013.01);
(Continued)

(58) Field of Classification Search
CPC ..... B60C 11/04; B60C 11/12; B60C 11/1204; B60C 11/1236; B60C 11/1259;
(Continued)

(56) References Cited

U.S. PATENT DOCUMENTS 5,814,169 A * 9/1998 Yamaguchi ............. B60C 11/11
152/209.22
7,836,926 B2 * 11/2010 Suzuki ................ B60C 11/0306
152/209.18
(Continued)

FOREIGN PATENT DOCUMENTS

JP 2006-160055 A 6/2006
JP 2012020620 A * 2/2012

OTHER PUBLICATIONS

Masataka Uchiyama, JP-2012020620-A, machine translation. (Year: 2012).*

*Primary Examiner* — Robert C Dye
*Assistant Examiner* — Sedef E Paquette
(74) *Attorney, Agent, or Firm* — Birch, Stewart, Kolasch & Birch, LLP (57) ABSTRACT

A pneumatic tire 1 is provided in a tread portion 2 with a circumferential land region 6 provided with transverse sipes 15 extending across the entire width of the circumferential land region. Each of the transverse sipes 15 comprises an arc-shaped first portion 18 convexed toward one side in the tire circumferential direction and an arc-shaped second portion 19 convexed toward the other side in the tire circumferential direction and connected with the first portion 18 so as to have a wavy configuration. The transverse sipes 15 include a first transverse sipe 16 of which first portion 18 is deeper than the second portion 19 thereof, and a second transverse sipe 17 of which second portion 19 is deeper than the first portion 18 thereof.

17 Claims, 9 Drawing Sheets

(51) Int. Cl.
*B60C 11/04* (2006.01)
*B60C 11/03* (2006.01)

(52) U.S. Cl.
CPC ...... *B60C 11/1236* (2013.01); *B60C 11/1392* (2013.01); *B60C 2011/0341* (2013.01); *B60C 2011/0388* (2013.01); *B60C 2011/1213* (2013.01); *B60C 2011/1268* (2013.01)

(58) Field of Classification Search
CPC ............ B60C 11/1263; B60C 11/1384; B60C 11/1392; B60C 2011/0341; B60C 2011/0388; B60C 2011/1213; B60C 2011/1268; B29D 2030/0613
USPC ........................................ 152/209.19, 209.25
See application file for complete search history.

(56) References Cited

U.S. PATENT DOCUMENTS

| | | | |
|---|---|---|---|
| 2006/0016537 A1* | 1/2006 | Kuroda ................... | B60C 11/12 152/209.18 |
| 2016/0152084 A1* | 6/2016 | Murata ............... | B60C 11/0306 152/209.8 |
| 2016/0152087 A1* | 6/2016 | Hayashi ............. | B60C 11/1392 152/209.18 |
| 2017/0253090 A1* | 9/2017 | Wakizono ........... | B60C 11/1236 |
| 2019/0001753 A1* | 1/2019 | Hayashi ................. | B60C 11/04 |

* cited by examiner

PNEUMATIC TIRE

TECHNICAL FIELD

The present invention relates to a pneumatic tire improved in both the steering stability on dry roads and the running performance on snowy/icy roads.

BACKGROUND ART

Japanese Patent Application Publication No. 2006-160055 discloses a pneumatic tire having land regions provided with straight sipes and L-shaped sipes in order to improve on-the-snow performance. Such straight or L-shaped sipe exert its edge effect to increase a frictional force only in one specific direction or two specific directions. Further, simply providing the land region with sipes tends to reduce the rigidity of the land region, and thereby the steering stability on dry roads tends to deteriorate.

SUMMARY OF THE INVENTION

The present invention was therefore made in view of the above, and a primary object of the present invention is to provide a pneumatic tire which is improved in the steering stability on dry roads and running performance on snowy/icy roads by improving the configurations of transverse sipes.

According to the present invention, a pneumatic tire comprises:
a tread portion provided with a circumferential land region, the circumferential land region provided with a plurality of transverse sipes extending across the entire axial width of the circumferential land region, wherein
each of the transverse sipes comprises
an arc-shaped first portion convexed toward one side in the tire circumferential direction, and
an arc-shaped second portion convexed toward the other side in the tire circumferential direction and connected with the first portion so as to have a wavy configuration, and
the transverse sipes include
a first transverse sipe of which first portion is deeper than the second portion thereof, and
a second transverse sipe of which second portion is deeper than the first portion thereof.

In the pneumatic tire according to the present invention, it may be possible that at least a part of the first portion has a constant depth, and at least a part of the second portion has a constant depth.

In the pneumatic tire according to the present invention, it may be possible that the depth of the transverse sipe varies in a range of the transverse sipe which range includes an interconnecting portion between the first portion and the second portion.

In the pneumatic tire according to the present invention, it may be possible that the transverse sipe consists of the first portion and the second portion.

In the pneumatic tire according to the present invention, it is preferable that the first portion curves with a constant radius $R1$ of curvature from one of the edges of the circumferential land region in the tire axial direction to a central portion of the circumferential land region in the tire axial direction, and
the second portion curves with a constant radius $R2$ of curvature from the other edge of the circumferential land region in the tire axial direction to the central portion of the circumferential land region in the tire axial direction.

The radii $R1$ and $R2$ of curvature are preferably in a range from 15 to 25 mm.

In the pneumatic tire according to the present invention, it is preferred that the first transverse sipe and the second transverse sipe are arranged alternately in the tire circumferential direction.

In the pneumatic tire according to the present invention, it is preferred that the circumferential land region is a crown rib disposed on the tire equator and provided only with the above-mentioned transverse sipes.

In the pneumatic tire according to the present invention, it is preferred that the tread portion is provided with circumferentially continuously extending main grooves including a pair of axially outermost shoulder main grooves and a pair of crown main grooves therebetween so that
the tread portion is axially divided into a shoulder land region axially outside each of the shoulder main grooves, a middle land region between each of the shoulder main grooves and the adjacent crown main groove, and a crown land region between the crown main grooves, and the crown land region is the above-mentioned circumferential land region provided with the transverse sipes.

In the pneumatic tire according to the present invention, it is preferable that the above-mentioned middle land region is a row of circumferentially arranged middle blocks, and
the middle blocks are each provided with a pair of a first combined sipe and a second combined sipe each composed of an axially inner arc-shaped curved portion and an axially outer straight portion, wherein the first combined sipe has a variable depth such that a maximum depth of the curved portion is greater than a maximum depth of the straight portion, whereas
the second combined sipe has a variable depth such that a maximum depth of the straight portion is greater than a maximum depth of the curved portion.

In the pneumatic tire according to the present invention, it is preferable that the middle blocks are each provided with a circumferential sipe connecting between the first combined sipe and the second combined sipe and positioned on the axially inside of an axial center position of the middle block.

In the pneumatic tire according to the present invention, it is preferable that a subdivided part of each said middle block defined between the first and second combined sipes is provided with a chamfer in a corner between a ground contacting top surface of the subdivided part and a sidewall of the subdivided part adjacent to the above-mentioned shoulder main groove.

In the pneumatic tire according to the present invention, it is preferable that the above-mentioned shoulder land region is provided with plural pairs of shoulder sipes extending axially outwardly from the above-mentioned shoulder main groove,
each subdivided part of the shoulder land region defined between one of the pairs of the shoulder sipes is provided with a second chamfer in a corner between a ground contacting top surface of the subdivided part and a sidewall of the subdivided part adjacent to the above-mentioned shoulder main groove, wherein the above-mentioned second chamfer is at least partially overlapped in the tire circumferential direction with one of the chamfers of the middle blocks.

In the pneumatic tire according to the present invention, therefor, the transverse sipes have a wavy configuration and can increase not only a frictional force in the tire circumferential direction but also a frictional force in the tire axial direction. Thereby, the cornering performance on snowy/icy roads is improved.

Further, the opposite sidewalls of the transverse sipe can engage with each other during running to maintain the apparent rigidity of the circumferential land region and thereby to maintain the steering stability on dry roads.

Furthermore, by the resultant shallow portions of the first and second transverse sipes, the rigidity of the circumferential land region can be maintained, and at the same time, a large frictional force can be obtained by the deep portions of the transverse sipes. Therefore, the steering stability on dry roads and the running performance on snowy/icy roads are improved in a good balance.

when the first transverse sipes and the second transverse sipes are arranged alternately, the rigidity distribution of the circumferential land region becomes uniform, and uneven wear of the circumferential land region can be suppressed.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

The term "sipe" means a very narrow groove having a width of not greater than 1.5 mm inclusive of a cut with no substantial width.

DESCRIPTION OF THE PREFERRED EMBODIMENTS

An embodiment of the present invention will now be described in detail in conjunction with accompanying drawings.

In the drawings, a pneumatic tire 1 as an embodiment of the present invention is a winter tire for passenger cars, but the present invention is not limited thereto.

A pneumatic tire comprises a tread portion whose outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion as well known in the art.

Figure 1:
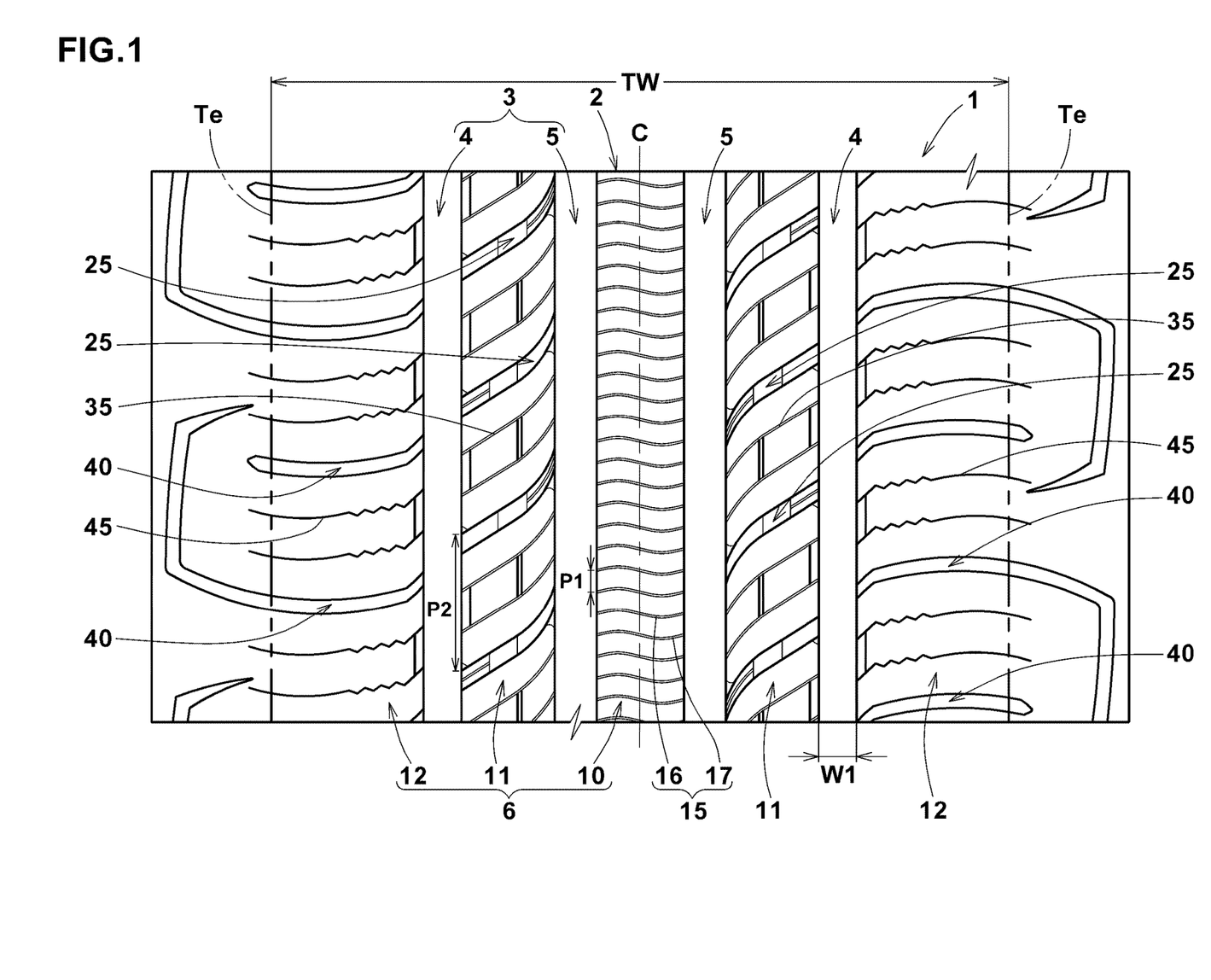
FIG. 1 is a development partial view of the tread portion of a pneumatic tire as an embodiment of the present invention.

As shown in FIG. 1 which shows the tread portion 2 of the pneumatic tire 1, the tread portion 2 is provided with main grooves 3 defined as extending continuously in the tire circumferential direction, and
the tread portion 2 is axially divided into circumferential land regions 6 by the main grooves 3.

The main grooves 3 are a pair of shoulder main grooves 4 disposed one on each side of the tire equator C as the axially outermost main grooves, and at least one crown main groove 5 disposed between the shoulder main grooves 4. In this embodiment, two crown main grooves 5 are disposed one on each side of the tire equator c. The above-mentioned at least one crown main groove 5 may be a single groove disposed on the tire equator C.

In this embodiment, each of the main grooves 4 and 5 is a linear groove extending straight in the tire circumferential direction with a constant groove width. However, each of or some of the main grooves 4 and 5 may be a nonlinear groove extending zigzag or wavy in the tire circumferential direction.

It is preferred that the main grooves 4 and 5 each have a groove width w1 of from 2 to 9% of then tread width TW. Also it is preferred that the main grooves 4 and 5 each have a depth of from 5.0 to 15.0 mm, for example. The main groove 4, 5 configured as such is helpful in improving the steering stability on dry roads and the running performance on snowy/icy roads in a good balance.

The circumferential land regions 6 in this embodiment are one crown land region 10 between the crown main grooves 5 which is disposed on the tire equator C, two middle land regions 11 between the crown main grooves 5 and the shoulder main grooves 4, and two shoulder land regions 12 between the shoulder main grooves 4 and the tread edges Te.

The crown land region 10 is provided with a plurality of transverse sipes 15 extending across the entire width of the crown land region 10.

The crown land region 10 in this example is a crown rib provided with only the transverse sipes 15 and no transverse grooves having a width greater than 1.5 mm. The crown rib configured as such has a high rigidity, therefore, it is possible to maintain the steering stability on dry roads.

Each of the transverse sipes 15 comprises an arc-shaped first portion 18 convexed toward one side in the tire circumferential direction (upper side in FIG. 2) and an arc-shaped second portion 19 convexed toward the other side in the tire circumferential direction (lower side in FIG. 2) and connected with the first portion 18 so as to have a wavy configuration.

Figure 2:
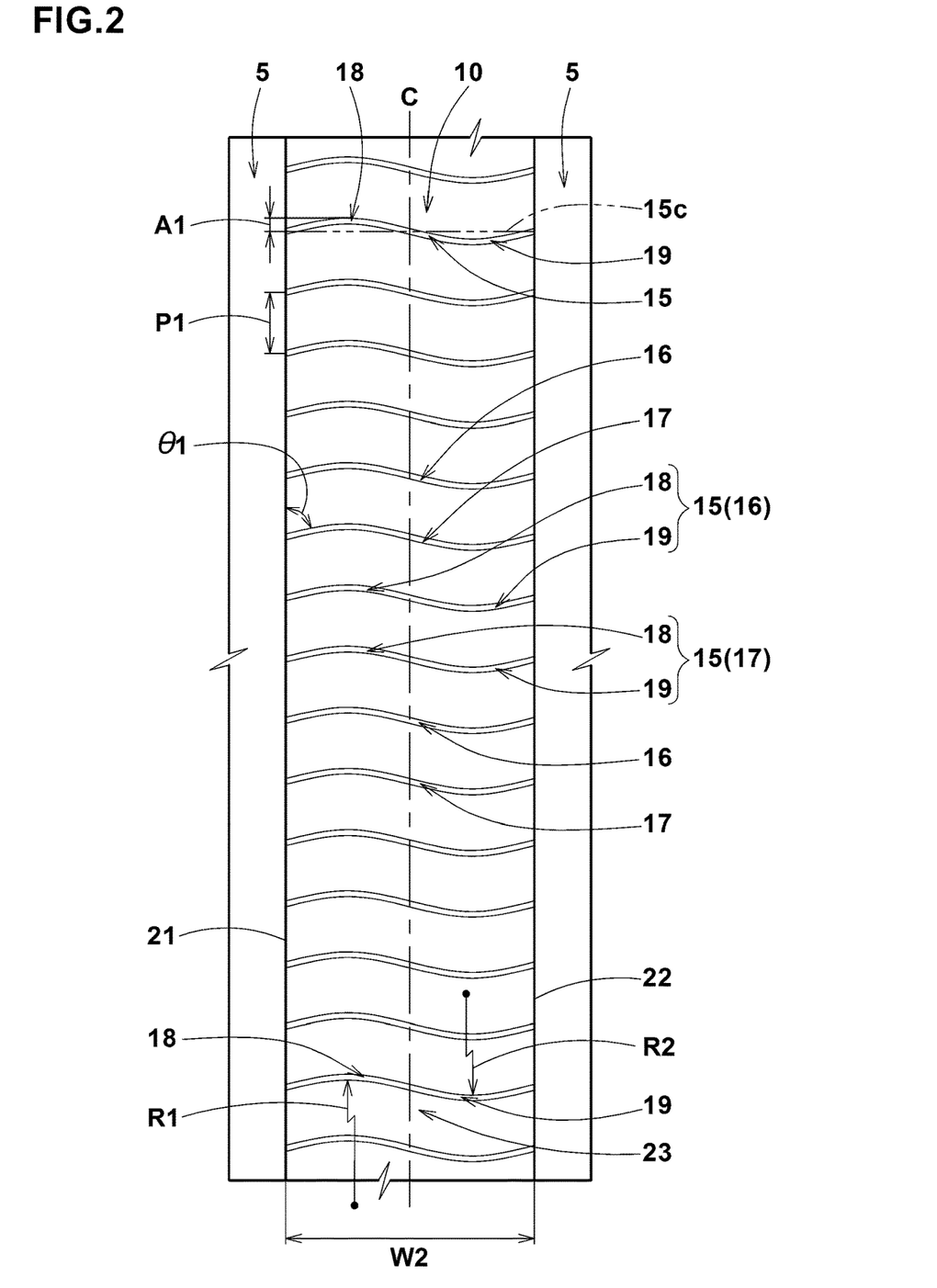
FIG. 2 is a partial top view of a crown land region in FIG. 1.

The transverse sipe 15 configured as such can increase the frictional force not only in the tire circumferential direction but also in the tire axial direction. The transverse sipe 15 can exert a high frictional force substantially in all directions by the first portion 18 and the second portion 19. Thereby, it is possible to improve the cornering performance on snowy/icy roads. Further, the opposite sidewalls of the transverse sipe 15 having the wavy configuration can engage with each other when the land region is subjected to a lateral force during running, and the parts of the land region circumferentially subdivided by the sipes can be prevented from shifting from each other in the tire axial direction. Accordingly, the apparent lateral rigidity of the land region is maintained, and it is possible to prevent the steering stability on dry roads from deteriorating.

The transverse sipes 15 include a first transverse sipe 16 and a second transverse sipe 17.

Figure 3A:
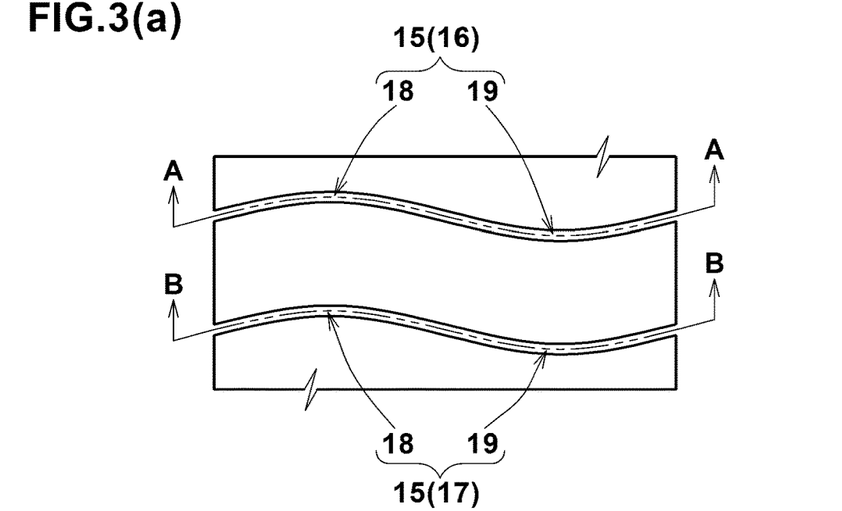
FIG. 3(a) is a magnified view of the first transverse sipe and the second transverse sipe in FIG. 2.

As shown in FIG. 3(a), the first transverse sipe 16 and the second transverse sipe 17 are similarly to each other in their top views, but these two types of sipes 16 and 17 have different depth variations.

Figure 3B:
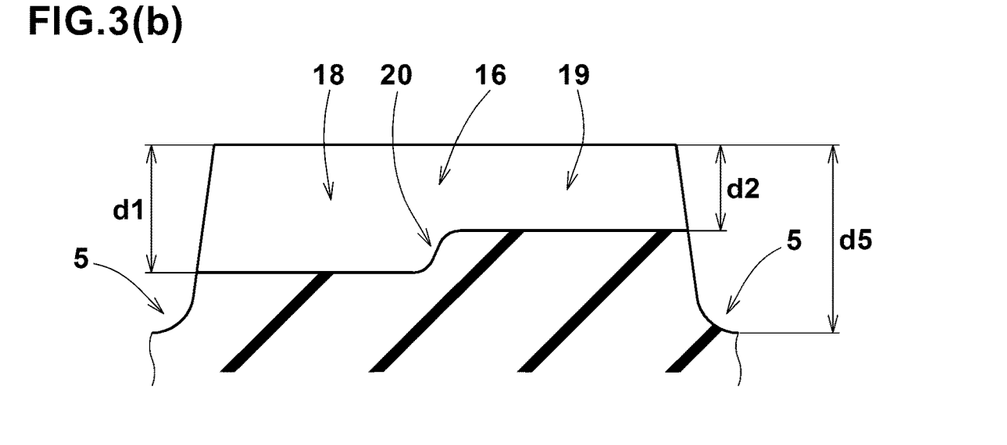
FIG. 3(b) is a cross-sectional view of the first transverse sipe taken along line A-A in FIG. 3(a).

As shown in FIG. 3(b), the first transverse sipe 16 is configured such that the depth d1 of the arc-shaped first portion 18 is greater than the depth d2 of the arc-shaped second portion 19.

Figure 3C:
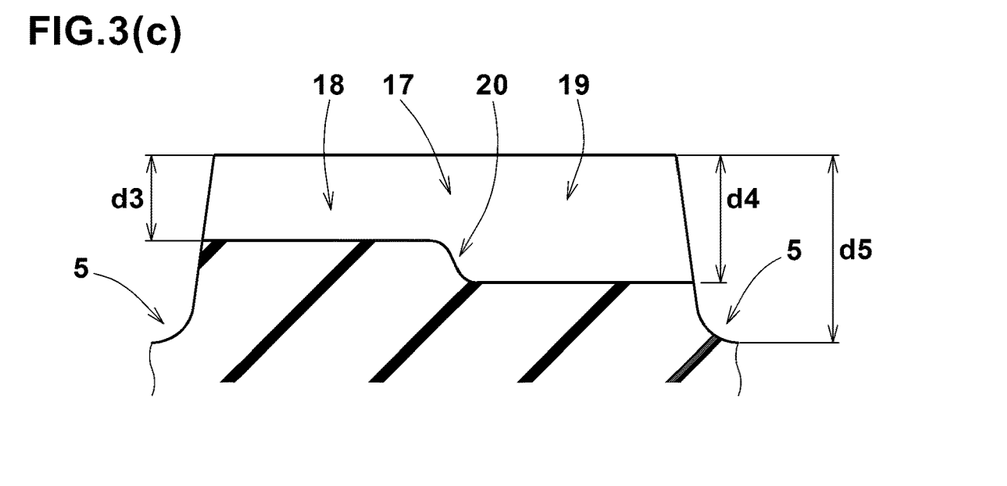
FIG. 3(c) is a cross-sectional view of the second transverse sipe taken along line B-B in FIG. 3(a).

As shown in FIG. 3(c), the second transverse sipe 17 is configured such that the depth d4 of the arc-shaped second portion 19 is greater than the depth d3 of the arc-shaped first portion 18.

Since the first and second transverse sipes 16 and 17 each comprise the first and second portions 18 and 19 whose depths are different from each other, it is possible to maintain the rigidity of the circumferential land region by the shallow portions, and at the same time, a large frictional force owing to the sipe edges can be obtained by the deep portions. Thereby, the steering stability on dry roads and the running performance on snowy/icy roads can be improved in a good balance.

In each of the first transverse sipe 16 and the second transverse sipe 17 in this embodiment, in order to further enhance the above described effects, at least a part of the arc-shaped first portion 18 has a constant depth along its longitudinal direction, and at least a part of the arc-shaped second portion 19 has a constant depth along its longitudinal direction. Preferably, the arc-shaped first portion 18 has a constant depth over its entire length, and the arc-shaped second portion 19 has a constant depth over its entire length. And the depth of the first/second transverse sipe 16/17 varies only in an interconnecting portion 20 of the transverse sipe which portion connects between the arc-shaped first portion 18 and the arc-shaped second portion 19.

The crown land region 10 provided with the transverse sipes 15 configured as such has an increased rigidity in each lateral portion in the tire axial direction, therefore, it is possible to turn impact sounds into white noise during running on dry roads.

For example, the depth d1 of the first portion 18 of the first transverse sipe 16 and the depth d4 of the second portion 19 of the second transverse sipe 17 are preferably set in a range from 0.65 to 0.75 times the depth d5 of the crown main groove 5, and the depth d2 of the second portion 19 of the first transverse sipe 16 and the depth d3 of the first portion 18 of the second transverse sipe 17 are preferably set in a range from 0.45 to 0.55 times the depth d5 of the crown main groove 5.

The first transverse sipe 16 and second transverse sipe 17 configured as such can maintain the rigidity of the crown land region 10 while providing a great frictional force by their edges.

As shown in FIG. 2, the first transverse sipe 16 and the second transverse sipe 17 in this embodiment are provided periodically in the tire circumferential direction. A typical example of the periodic arrangement is an alternate arrangement. Alternatively, a group of two or three of the first transverse sipe 16 and a group of two or three of the second transverse sipe 17 may be arranged alternately. Thereby, it is possible to make the rigidity distribution of the crown land region 10 uniform, therefore, it is possible to suppress the uneven wear of the crown land region 10.

It is preferable that the transverse sipes 15 (16 and 17) are arranged at a circumferential pitch P1 of from 0.20 to 0.30 times a width w2 of the crown land region 10. The transverse sipes 16 and 17 arranged as such can exert the sufficient edge effect on snowy/icy roads.

In this embodiment, each of the transverse sipes 15 (16 and 17) forms substantially one cycle of a wave by the first portion 18 and the second portion 19. However, the transverse sipe 15 is not limited to such a wavy configuration, and may comprise a plurality of the first portions 18 and a plurality of the second portions 19 so as to form a wave having a plurality of amplitudes, in other words, a wave having a variable amplitude and plural cycles.

It is preferable that each of the transverse sipes 15 (16 and 17) extends such that a center line 15c of the amplitude of its wave is inclined with respect to the tire axial direction at an angle not greater than 15 degrees, for example. The center line 15c in this embodiment extends parallel with the tire axial direction. The transverse sipe 15 configured as such can effectively suppress uneven wear of the crown land region 10.

It is preferable that an amplitude A1 from the center line 15c of the amplitude of the first portion 18 or the second portion 19 is set in a range from 0.20 to 0.30 times the pitch P1, for example.

If the amplitude A1 is smaller than 0.20 times the pitch P1, it is possible that the above described effects become small. If the amplitude A1 is greater than 0.30 times the pitch P1, it is possible that uneven wear occurs in the crown land region 10.

It is preferred that an angle θ1 of the transverse sipe 15 at its end with respect to the crown main groove 5 is set in a range from 70 to 90 degrees. Thereby, it is possible to prevent a damage of the transverse sipe 15 starting from its end.

The first portion 18 curves with the constant radius R1 of curvature from one edge 21 of the crown land region 10 in the tire axial direction to the central portion 23 of the crown land region in the tire axial direction.

The second portion 19 curves with the constant radius R2 of curvature from the other edge 22 of the crown land region 10 in the tire axial direction to the central portion 23.

The transverse sipe 15 configured as such increases frictional forces in multiple directions by the edges and is helpful in preventing stress concentration in a part of the crown land region 10.

In order to further enhance the above described effects, the radii R1 and R2 of curvature are preferably not less than 15 mm, more preferably not less than 18 mm, and preferably not greater than 25 mm, more preferably not greater than 22 mm.

Figure 4:
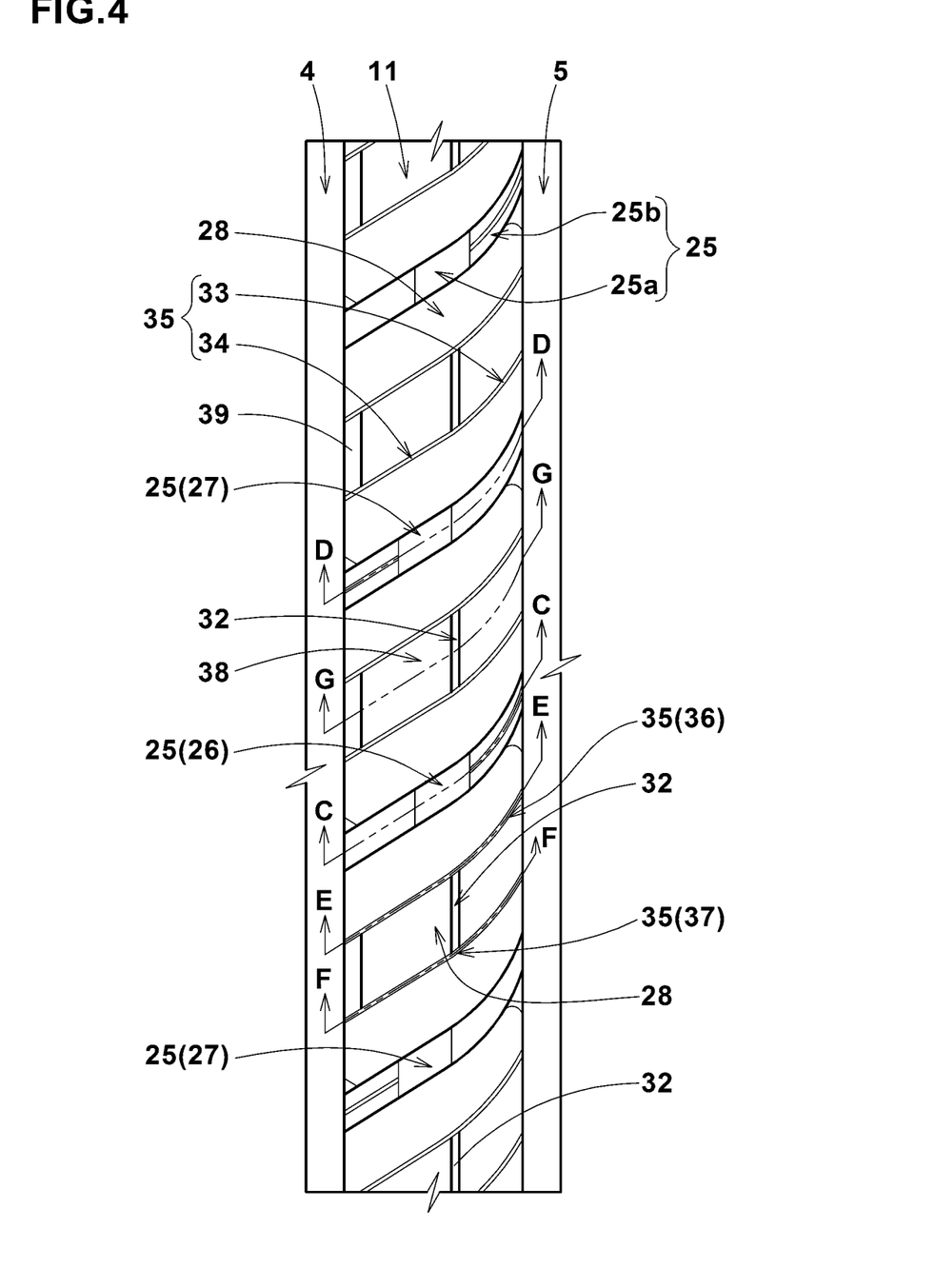
FIG. 4 is a partial top view of a middle land region in FIG. 1.

As shown in FIG. 4, the above-mentioned middle land regions 11 are each provided with a plurality of middle transverse grooves 25 extending across the entire width of the middle land region 11 so that the middle land region 11 is circumferentially divided into a row of circumferentially arranged middle blocks 28.

The middle transverse groove 25 in this example comprises a main portion 25*a* extending straight at an angle of 30 to 40 degrees with respect to the tire axial direction, and a curved portion 25*b* curved and extending on the axially inside of the main portion 25*a*.

The curved portion 25*b* in this example is curved such that its angle with respect to the tire axial direction gradually decreases toward the main portion 25*b*. The middle transverse groove 25 configured as such is helpful in smoothly guiding the water in the crown main groove 5 toward the axially outside.

It is preferable that the middle transverse grooves 25 are arranged in the tire circumferential direction at a circumferential pitch P2 (shown in FIG. 1) which is in a range from 4.0 to 6.0 times the circumferential pitch P1 of the transverse sipes 15 provided in the crown land region 10.

The middle transverse groove 25 configured as such maintains the rigidity of the middle land region 11 at a high level, therefore, it is possible to improve the steering stability on dry roads.

Figure 5A:
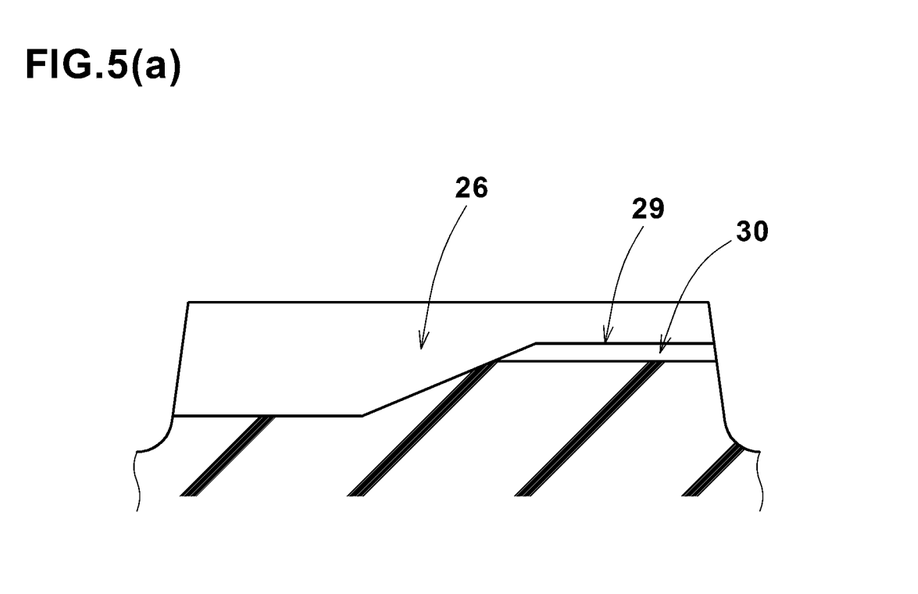
FIG. 5(a) is a cross-sectional view of a first middle transverse groove taken along line C-C in FIG. 4.
Figure 5B:
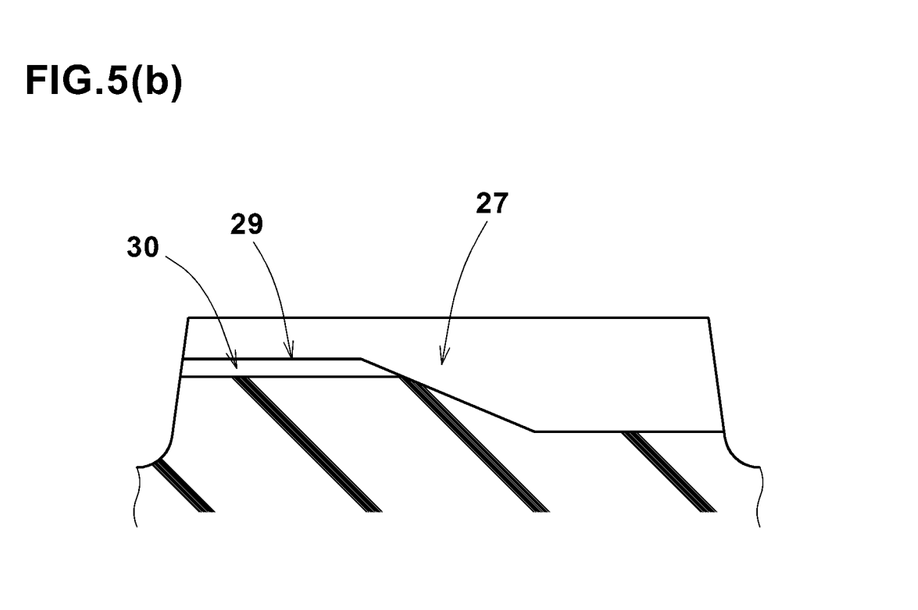
FIG. 5(b) is a cross-sectional view of a second middle transverse groove taken along line D-D in FIG. 4.

In this embodiment, as shown in FIG. 4, the middle transverse grooves 25 include a first middle transverse groove 26 whose depth variation along the longitudinal direction is shown in FIG. 5(*a*), and a second middle transverse groove 27 whose depth variation along the longitudinal direction is shown in FIG. 5(*b*).

The first middle transverse groove 26 is provided with a tie bar 29 which rises from the groove bottom on one side in the tire axial direction (axially inside in this embodiment) as shown in FIG. 5(*a*), and the second middle transverse groove 27 is provided with a tie bar 29 which rises from the groove bottom on the other side in the tire axial direction (axially outside in this embodiment) as shown in FIG. 5(*b*).

The first middle transverse groove 26 and the second transverse groove 27 can maintain the rigidity of the middle land region 11, therefore, they are helpful in maintaining the steering stability on dry roads.

Preferably, each of the tie bars 29 is provided in its top surface with a sipe 30 extending over the entire length thereof and having a depth less than the height of the tie bar. The sipe 30 makes it easy for the middle transverse groove 25 to open without decreasing the reinforcing effect of the tie bar 29, therefore, it is possible to suppress the snow from stuffing in the middle transverse groove 25 during running on snow-covered roads.

The middle blocks 28 divided by the middle transverse grooves 25 are each provided with at least one combined sipe 35 extending across the entire width of the middle block 28 as shown in FIG. 4.

The combined sipe 35 is composed of an arc-shaped portion 33 curved to be arc-shaped, and a straight portion 34 extending axially outwardly from the arc-shaped portion 33. The combined sipes 35 can suppress deformation in the tire axial direction of the middle land region 11 while the straight portions 34 providing great frictional force by the edges, and the arc-shaped portions 33 exerting edge effects in multiple directions. Thereby, it is possible to improve the steering stability on dry roads and the running performance on snowy/icy roads in a good balance.

The arc-shaped portion 33 is preferably inclined to the same direction as the curved portion 25*b* of the middle transverse groove 25.

The straight portion 34 is preferably inclined to the same direction as the main portion 25*a* of the middle transverse groove 25. More preferably, the straight portion 34 extends in parallel with the main portion 25*a*.

The arc-shaped portion 33 and the main portion 25*a* configured as such are helpful in making the rigidity distribution of the middle land region 11 uniform.

Figure 6A:
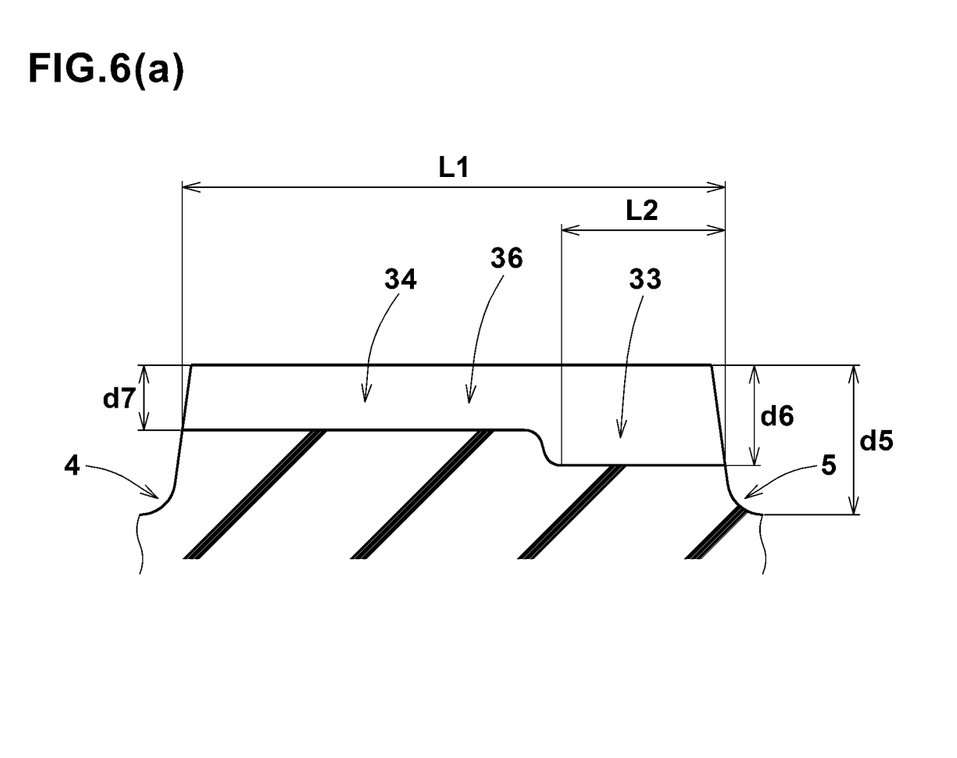
FIG. 6(a) is a cross-sectional view of a first combined sipe taken along line E-E in FIG. 4.
Figure 6B:
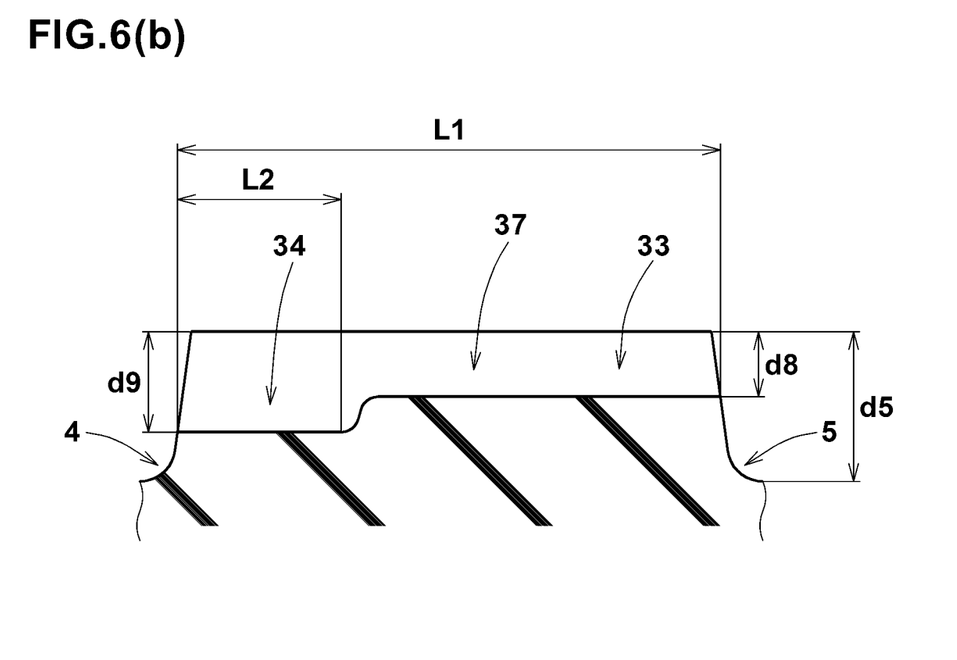
FIG. 6(b) is a cross-sectional view of a second combined sipe taken along line F-F in FIG. 4.

In this embodiment, it is preferred that the combined sipes 35 include a first combined sipe 36 whose depth variation along the longitudinal direction is shown in FIG. 6(*a*), and a second combined sipe 37 whose depth variation along the longitudinal direction is shown in FIG. 6(*b*).

As shown in FIG. 6(*a*), the first combined sipe 36 is configured such that a maximum depth d6 of the arc-shaped portion 33 is greater than a maximum depth d7 of the straight portion 34.

As shown in FIG. 6(*b*), the second combined sipe 37 is configured such that a maximum depth d9 of the straight portion 34 is greater than a maximum depth d8 of the arc-shaped portion 33. The first combined sipe 36 and the second combined sipe 37 configured as such can maintain the rigidity of the middle land region 11 by their resultant shallower portions, and it is possible to provide a great frictional force by the edges of their deep portions.

In order to satisfy both the steering stability on dry roads and the running performance on snowy/icy roads, it is preferred that the maximum depth d6 of the arc-shaped portion 33 of the first combined sipe 36 and the maximum depth d9 of the straight portion 34 of the second combined sipe 37 are set in a range from 0.65 to 0.75 times the depth d5 of the crown main groove 5, and the maximum depth d7 of the straight portion 34 of the first combined sipe 36 and the maximum depth d8 of the arc-shaped portion 33 of the second combined sipe 37 are set in a range from 0.45 to 0.55 times the depth d5 of the crown main groove 5.

From the similar point of view, it is preferable that, in each of the combined sipes 36 and 37, a length L2 in the tire axial direction of the portion having the greater depth is set in a range from 0.30 to 0.40 times a length L1 in the tire axial direction of the concerned combined sipe 36/37.

In this embodiment, as shown in FIG. 4, each of the middle blocks 28 is provided with one pair of the first combined sipe 36 and the second combined sipe 37. Thereby, uneven wear of the middle block 28 is suppressed.

The middle block 28 is preferably provided between the first combined sipe 36 and the second combined sipe 37 with a circumferential sipe 32 connecting therebetween.

The circumferential sipe 32 is preferably disposed axially inside the axial center position of the middle block 28.

The circumferential sipe 32 configured as such can improve the cornering performance on snowy/icy roads.

Figure 7:
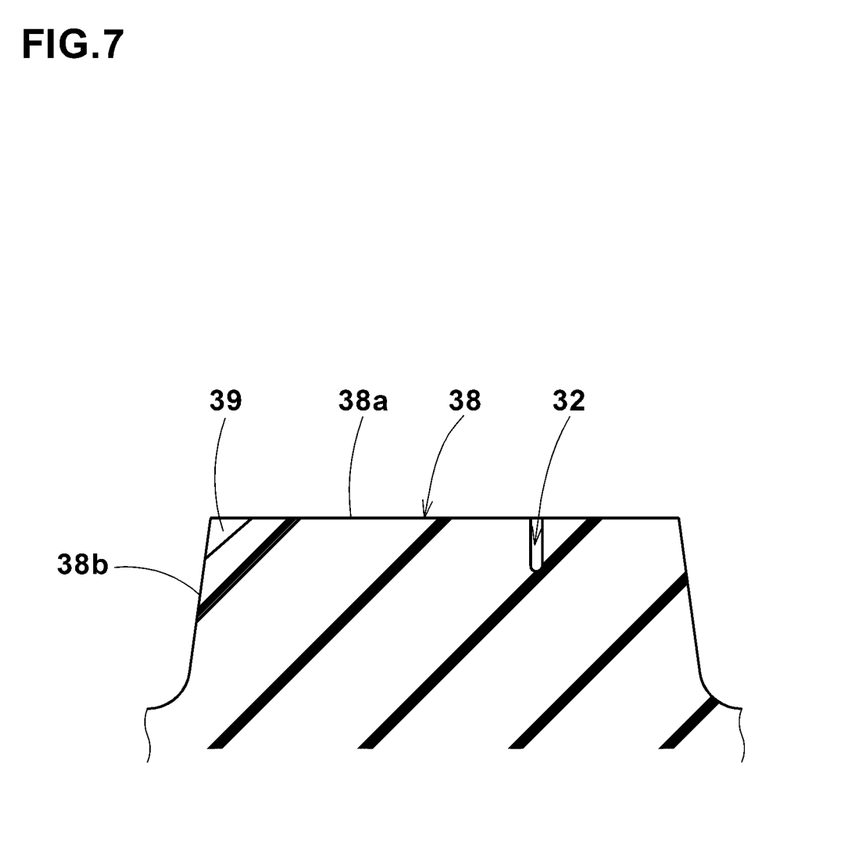
FIG. 7 is a cross-sectional view of a middle block taken along line G-G in FIG. 4.

FIG. 7 is a cross sectional view of the middle block 28 taken along line G-G in FIG. 4. As shown, a subdivided part 38 between the first combined sipe 36 and the second combined sipe 37 is preferably provided with a chamfer 39 in the corner between a ground contacting top surface 38a of the subdivided part 38 and a sidewall 38b of the subdivided part 38 adjacent to the shoulder main groove. The chamfer 39 configured as such is helpful in making a big snow block compressed into the shoulder main groove 4.

Figure 8:
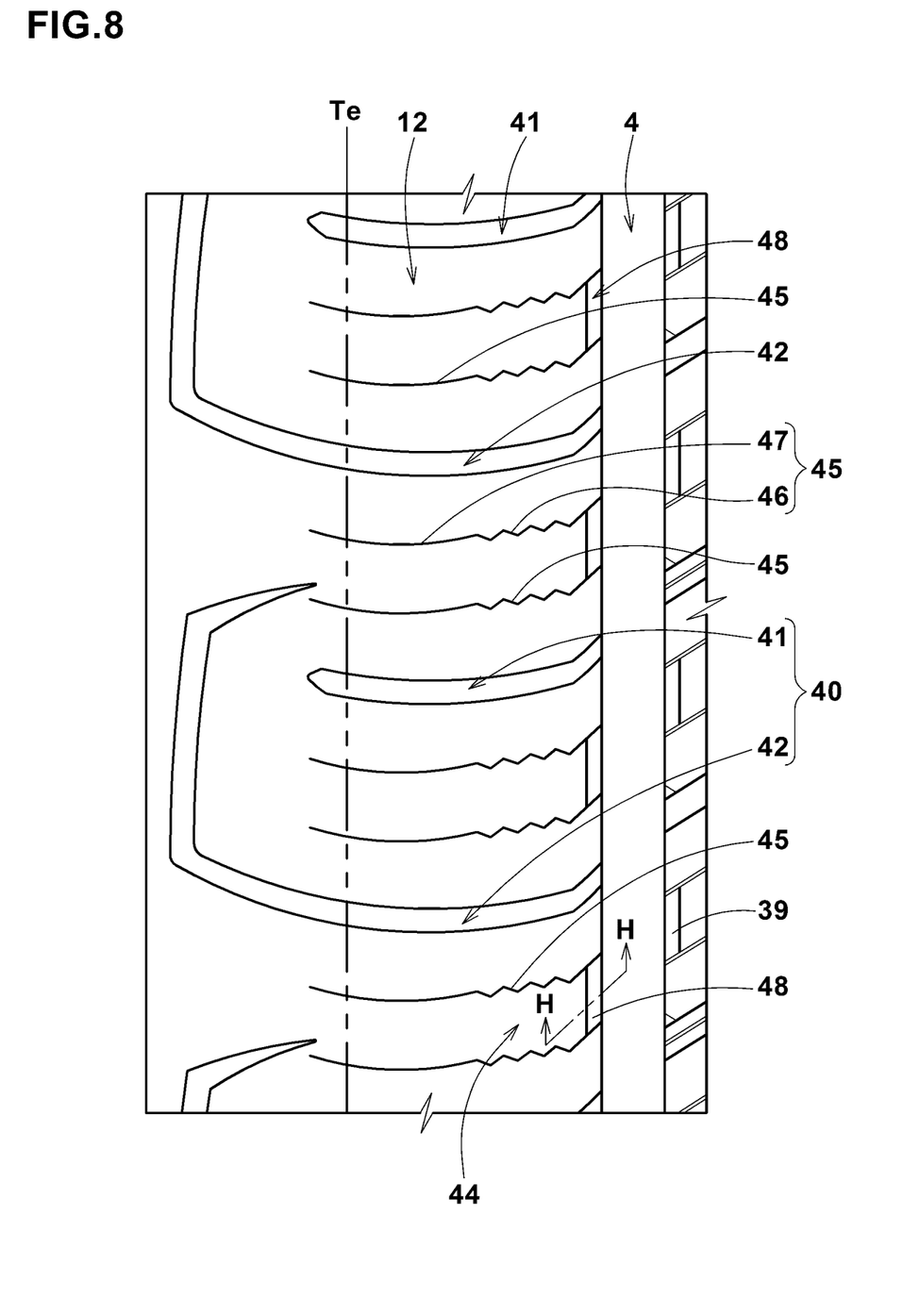
FIG. 8 is a partial top view of a shoulder land region in FIG. 1.

As shown in FIGS. 1 and 8, the above-mentioned shoulder land region 12 between each of the shoulder main grooves 4 and the adjacent tread edge Te is provided with a plurality of shoulder transverse grooves 40 and a plurality of shoulder sipes 45.

The shoulder transverse grooves 40 include a first shoulder transverse groove 41 extending axially outwardly from the shoulder main groove 4 and terminating in a vicinity of the tread edge Te, and a second shoulder transverse groove 42 extending axially outwardly from the shoulder main groove 4 beyond the axially outer end of the first shoulder transverse groove 41. In this embodiment, the first shoulder transverse groove 41 extends beyond the tread edge Te, and the second shoulder transverse groove 42 is bent toward one circumferential direction at a position outside the tread edge, in other words, all of the shoulder transverse grooves 40 extend from the shoulder main groove 4 to the tread edge Te.

Preferably, the first shoulder transverse groove 41 and the second shoulder transverse groove 42 are arranged alternately in the tire circumferential direction.

The first shoulder transverse groove 41 and the second shoulder transverse groove 42 configured as such improve the steering stability on dry roads and the wandering performance on snowy/icy roads in a good balance.

Between every two of the circumferentially adjacent first and second shoulder transverse grooves 41 and 42, two or more (in this embodiment, two) of the shoulder sipes 45 are disposed.

The shoulder sipe 45 in this example extends axially outwardly from the shoulder main groove 4.

The shoulder sipe 45 in this example comprises an axially inner first sipe portion 46 extending in a zigzag manner, and an axially outer second sipe portion 47 extending in a smoothly curved manner. The shoulder sipes 45 configured as such mitigate the apparent rigidity of the shoulder land region 12 in the vicinity of the tread edge Te and is helpful in improving the wandering performance on snowy/icy roads.

Figure 9:
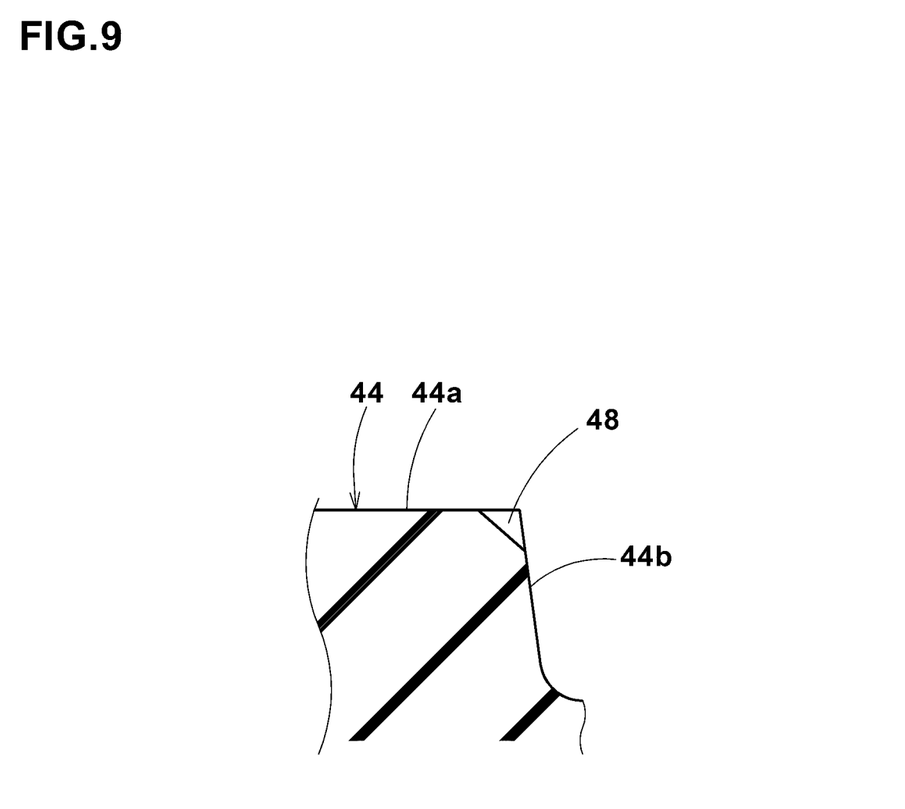
FIG. 9 is a cross-sectional view of the shoulder land region taken along line H-H in FIG. 8.

FIG. 9 is a cross sectional view of a part of the shoulder land region (in this embodiment, a shoulder block divided by the shoulder transverse grooves 40) taken along line H-H in FIG. 8. As shown, a subdivided part 44 between the adjacent two shoulder sipes 45 is preferably provided with a chamfer 48 in the corner between a ground contacting top surface 44a of the subdivided part 44 and a sidewall 44b of the subdivided part 44 adjacent to the shoulder main groove.

In the tire circumferential direction, preferably, the chamfer 48 is at least partially overlapped with one of the chamfers 39 provided in the middle land region 11 as shown in FIG. 8. Thereby, during running on snow-covered roads, it is possible to obtain a larger shearing force from the compacted snow block.

While detailed description has been made of an embodiment of the present invention, the present invention can be embodied in various forms without being limited to the illustrated embodiment.

Comparison Tests

Based on the tread pattern shown in FIG. 1, pneumatic tires of size 215/60R16 (Rim size: 16×6J) were experimentally manufactured as test tires including working examples Ex.1-Ex.13 and a comparative example Ref. In the comparative example, each of the sipes was modified to have a constant depth.

The specifications of the test tires are shown in Table 1.

With respect to the braking performance and cornering performance on snowy/icy roads, the steering stability on dry roads and the wear resistance performance, the test tires were evaluated as follows by the use of a test car (2400 cc front-wheel drive passenger car) provided on all wheels with test tires inflated to 240 kPa.

<Braking Performance and Cornering Performance on Snowy/Icy Road>

The braking performance and the cornering performance on snowy/icy roads were evaluated based on the driver's feeling. The results are indicated in Table 1 by an evaluation point based on the comparative example Ref. being 100, wherein the larger the numeric value, the better the performance (braking performance/cornering performance on snowy/icy roads).

<Steering Stability on Dry Road>

The steering stability was evaluated based on the driver's feeling during running on a dry road.

The results are indicated in Table 1 by an evaluation point based on the comparative example Ref. being 100, wherein the larger the numeric value, the better the steering stability on dry roads.

<Wear Resistance Performance>

The amount of wear of the circumferential land region was measured after the test car was driven for a predetermined distance on a dry road.

The results are indicated in Table 1 by an index based on the comparative example Ref. being 100, wherein the smaller the numeric value, the better the wear resistance performance.

TABLE 1

| Tire | Ref. | Ex. 1 | Ex. 2 | Ex. 3 | Ex. 4 | Ex. 5 | Ex. 6 | Ex. 7 |
|---|---|---|---|---|---|---|---|---|
| Depth d1 of first portion of first transverse sipe/ Depth d5 of crown main groove | 0.60 | 0.70 | 0.60 | 0.65 | 0.75 | 0.80 | 0.70 | 0.70 |
| Depth d2 of second portion of first transverse sipe/ Depth d5 of crown main groove | 0.60 | 0.50 | 0.50 | 0.50 | 0.50 | 0.50 | 0.40 | 0.45 |
| Depth d3 of first portion of second transverse sipe/ Depth d5 of crown main groove | 0.60 | 0.50 | 0.50 | 0.50 | 0.50 | 0.50 | 0.40 | 0.45 |

TABLE 1-continued

| | | | | | | | | |
|---|---|---|---|---|---|---|---|---|
| Depth d4 of second portion of second transverse sipe/ Depth d5 of crown main groove | 0.60 | 0.70 | 0.60 | 0.65 | 0.75 | 0.80 | 0.70 | 0.70 |
| Radius R1 of curvature of first portion and Radius R2 of curvature of second portion (mm) | 20 | 20 | 20 | 20 | 20 | 20 | 20 | 20 |
| Braking performance on snowy/icy road | 100 | 105 | 104 | 104 | 105 | 106 | 103 | 104 |
| Cornering performance on snowy/icy road | 100 | 106 | 104 | 105 | 106 | 107 | 104 | 105 |
| Steering Stability on dry road | 100 | 108 | 109 | 108 | 106 | 105 | 109 | 109 |
| Wear resistance performance | 100 | 95 | 94 | 95 | 97 | 99 | 93 | 94 |

| Tire | Ex. 8 | Ex. 9 | Ex. 10 | Ex. 11 | Ex. 12 | Ex. 13 |
|---|---|---|---|---|---|---|
| Depth d1 of first portion of first transverse sipe/ Depth d5 of crown main groove | 0.70 | 0.70 | 0.70 | 0.70 | 0.70 | 0.70 |
| Depth d2 of second portion of first transverse sipe/ Depth d5 of crown main groove | 0.55 | 0.60 | 0.50 | 0.50 | 0.50 | 0.50 |
| Depth d3 of first portion of second transverse sipe/ Depth d5 of crown main groove | 0.55 | 0.60 | 0.50 | 0.50 | 0.50 | 0.50 |
| Depth d4 of second portion of second transverse sipe/ Depth d5 of crown main groove | 0.70 | 0.70 | 0.70 | 0.70 | 0.70 | 0.70 |
| Radius R1 of curvature of first portion and Radius R2 of curvature of second portion (mm) | 20 | 20 | 10 | 15 | 25 | 30 |
| Braking performance on snowy/icy road | 105 | 106 | 103 | 104 | 106 | 107 |
| Cornering performance on snowy/icy road | 106 | 106 | 107 | 106 | 105 | 105 |
| Steering Stability on dry road | 107 | 104 | 108 | 108 | 107 | 106 |
| Wear resistance performance | 95 | 97 | 98 | 97 | 95 | 95 |

From the test results, it was confirmed that the tires as the working examples were improved in the steering stability on dry roads and the running performance on snowy/icy roads. Further, it was confirmed that the tires as the working examples had excellent wear resistance performance.

REFERENCE SIGNS LIST 2 tread portion
6 circumferential land region
15 transverse sipe
16 first transverse sipe
17 second transverse sipe
18 first portion
19 second portion

The invention claimed is:

1. A pneumatic tire comprising:
a tread portion provided with a circumferential land region, the circumferential land region provided with a plurality of transverse sipes extending across an entire width of the circumferential land region,
wherein
each of said plurality of transverse sipes comprises:
an arc-shaped first portion convexed toward one side in a tire circumferential direction and
an arc-shaped second portion convexed toward the other side in the tire circumferential direction and connected with the arc-shaped first portion so as to have a wavy configuration, and
said plurality of transverse sipes include:
a first transverse sipe in which the arc-shaped first portion is deeper than the arc-shaped second portion, and
a second transverse sipe in which the arc-shaped second portion is deeper than the arc-shaped first portion,
wherein
the tread portion is provided with circumferentially continuously extending main grooves including a pair of axially outermost shoulder main grooves and a pair of crown main grooves therebetween so that the tread portion is axially divided into a shoulder land region axially outside each said shoulder main groove, a middle land region between each said shoulder main groove and the adjacent crown main groove, and a crown land region between the crown main grooves,
wherein
the crown land region is said circumferential land region provided with said plurality of transverse sipes,
wherein
said middle land region is provided with middle transverse grooves extending thereacross so as to be circumferentially divided into a row of circumferentially arranged middle blocks, and
each of the middle blocks is provided with a pair of a first combined sipe and a second combined sipe each extending thereacross and each composed of an axially inner arc-shaped curved portion and an axially outer straight portion,
wherein
the first combined sipe has a variable depth such that a maximum depth of the curved portion is greater than a maximum depth of the straight portion,
wherein
the second combined sipe has a variable depth such that a maximum depth of the straight portion is greater than a maximum depth of the curved portion, and
wherein
in a subdivided part of each said middle block defined between the first and second combined sipes, a corner formed between a ground contacting top surface of the subdivided part and a sidewall of the subdivided part adjacent to said shoulder main groove is provided with a chamfer so as to extend from the first combined sipe to the second combined sipe,
wherein
said chamfer is formed only on the corner extending between the first combined sipe and the second combined sipe, and
wherein
said middle transverse grooves include first middle transverse grooves and second middle transverse grooves,
each of the first middle transverse grooves is provided with a tie bar rising from the groove bottom thereof in its part on one side in the tire axial direction, each of the second middle transverse grooves is provided with a tie bar rising from the groove bottom thereof in its part on the other side in the tire axial direction, and each of the tie bars is provided, in its radially outer surface, with a sipe extending over the entire length of the tie bar.

2. The pneumatic tire according to claim 1, wherein
in each of said plurality of transverse sipes, at least a part of the arc-shaped first portion has a constant depth, and at least a part of the arc-shaped second portion has a constant depth.

3. The pneumatic tire according to claim 1, wherein a depth of each of said plurality of transverse sipes varies in a range of the transverse sipe which range includes an interconnecting portion between the first portion and the second portion.

4. The pneumatic tire according to claim 1, wherein the first transverse sipe and the second transverse sipe are arranged alternately in the tire circumferential direction.

5. The pneumatic tire according to claim 4, wherein
the first middle transverse grooves and the second middle transverse grooves are alternately arranged in the tire circumferential direction.

6. The pneumatic tire according to claim 1, wherein
each of the middle blocks is provided with a circumferential sipe connecting between the first combined sipe and the second combined sipe and positioned on an axially inside of an axial center position of the middle block.

7. The pneumatic tire according to claim 1, wherein
each of said plurality of transverse sipes consists of the arc-shaped first portion and the arc-shaped second portion.

8. The pneumatic tire according to claim 1, wherein
the arc-shaped first portion curves with a constant radius (R1) of curvature from one of edges of the circumferential land region in a tire axial direction to a central portion of the circumferential land region in the tire axial direction, and the arc-shaped second portion curves with a constant radius (R2) of curvature from the other of the edges of the circumferential land region in the tire axial direction to the central portion of the circumferential land region in the tire axial direction.

9. The pneumatic tire according to claim 8, wherein the radii (R1 and R2) of curvature are in a range from 15 to 25 mm.

10. The pneumatic tire according to claim 1, wherein
each sipe of said plurality of transverse sipes extends such that a center line of the amplitude of its wavy configuration is inclined with respect to the tire axial direction at an angle not greater than 15 degrees.

11. The pneumatic tire according to claim 10, wherein
said plurality of transverse sipes are arranged at a circumferential pitch (P1), and
a maximum amplitude (A1) of said arc-shaped first portion and said arc-shaped second portion from said center line are in a range from 0.20 to 0.30 times the circumferential pitch (P1).

12. The pneumatic tire according to claim 10, wherein
an angle (θ1) of each of said plurality of transverse sipes measured at its end on the crown main groove side is in a range from 70 to 90 degrees with respect to the crown main groove.

13. A pneumatic tire comprising:
a tread portion provided with a circumferential land region, the circumferential land region provided with a plurality of transverse sipes extending across an entire width of the circumferential land region, wherein
each of said plurality of transverse sipes comprises:
an arc-shaped first portion convexed toward one side in a tire circumferential direction and
an arc-shaped second portion convexed toward the other side in the tire circumferential direction and connected with the arc-shaped first portion so as to have a wavy configuration, and said transverse sipes include:
a first transverse sipe in which the arc-shaped first portion is deeper than the arc-shaped second portion, and
a second transverse sipe in which the arc-shaped second portion is deeper than the arc-shaped first portion, wherein
the tread portion is provided with circumferentially continuously extending main grooves including a pair of axially outermost shoulder main grooves and a pair of crown main grooves therebetween so that the tread portion is axially divided into a shoulder land region axially outside each said shoulder main groove, a middle land region between each said shoulder main groove and the adjacent crown main groove, and a crown land region between the crown main grooves, wherein
the crown land region is said circumferential land region provided with said plurality of transverse sipes, wherein
said middle land region is provided with middle transverse grooves extending thereacross so as to be circumferentially divided into a row of circumferentially arranged middle blocks, and each of the middle blocks is provided with a pair of a first combined sipe and a second combined sipe each extending thereacross and each composed of an axially inner arc-shaped curved portion and an axially outer straight portion, wherein
the first combined sipe has a variable depth such that a maximum depth of the curved portion is greater than a maximum depth of the straight portion, wherein
the second combined sipe has a variable depth such that a maximum depth of the straight portion is greater than a maximum depth of the curved portion, wherein
in a subdivided part of each said middle block defined between the first and second combined sipes, a corner formed between a ground contacting top surface of the subdivided part and a sidewall of the subdivided part adjacent to the shoulder main groove is provided with a first chamfer extending from the first combined sipe to the second combined sipe, wherein
said first chamfer is formed only on the corner extending between the first combined sipe and the second combined sipe, wherein
said shoulder land region is provided with a plurality of shoulder transverse grooves extending thereacross so as to be circumferentially divided into a row of circumferentially arranged shoulder blocks, and each of the shoulder blocks is provided with a pair of shoulder sipes extending axially outwardly from said shoulder main groove, wherein in a subdivided part of each said shoulder block defined between said pair of shoulder sipes, a corner formed between a ground contacting top surface of the subdivided part and a sidewall of the subdivided part adjacent to said shoulder main groove is provided with a second chamfer, wherein
said second chamfer is formed only on the corner extending between the pair of shoulder sipes, and wherein
said second chamfer is at least partially overlapping in the tire circumferential direction with one of the chamfers of the middle blocks, wherein
said middle transverse grooves include first middle transverse grooves and second middle transverse grooves, each of the first middle transverse grooves is provided with a tie bar rising from the groove bottom thereof in its part on one side in the tire axial direction, each of the second middle transverse grooves is provided with a tie bar rising from the groove bottom thereof in its part on the other side in the tire axial direction, and each of the tie bars is provided, in its radially outer surface, with a sipe extending over the entire length of the tie bar.

14. The pneumatic tire according to claim 13, wherein each of said plurality of transverse sipes consists of the arc-shaped first portion and the arc-shaped second portion.

15. The pneumatic tire according to claim 13, wherein the arc-shaped first portion curves with a constant radius (R1) of curvature from one of edges of the circumferential land region in a tire axial direction to a central portion of the circumferential land region in the tire axial direction, and the arc-shaped second portion curves with a constant radius (R2) of curvature from the other of the edges of the circumferential land region in the tire axial direction to the central portion of the circumferential land region in the tire axial direction.

16. The pneumatic tire according to claim 13, wherein the first transverse sipe and the second transverse sipe are arranged alternately in the tire circumferential direction.

17. The pneumatic tire according to claim 16, wherein the first middle transverse grooves and the second middle transverse grooves are alternately arranged in the tire circumferential direction.

* * * * *